Figure 1:
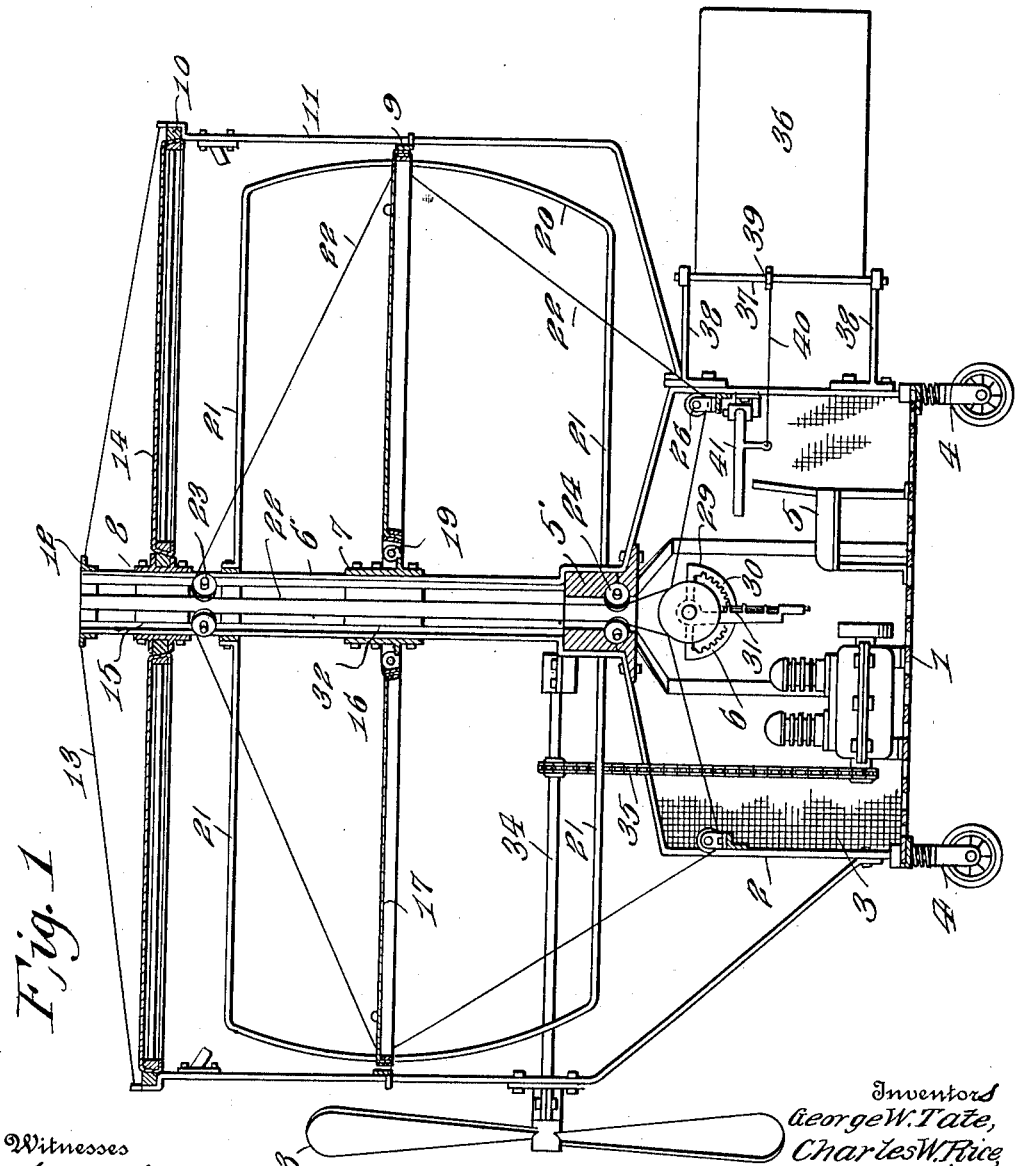

G. W. TATE & C. W. RICE.
FLYING MACHINE.
APPLICATION FILED MAY 10, 1911. RENEWED DEC. 14, 1911.

1,020,935.

Patented Mar. 19, 1912.

3 SHEETS—SHEET 1.

Witnesses
Frank Hugh
C. C. Hiner.

Inventors
George W. Tate,
Charles W. Rice,

By Victor J. Evans
Attorney

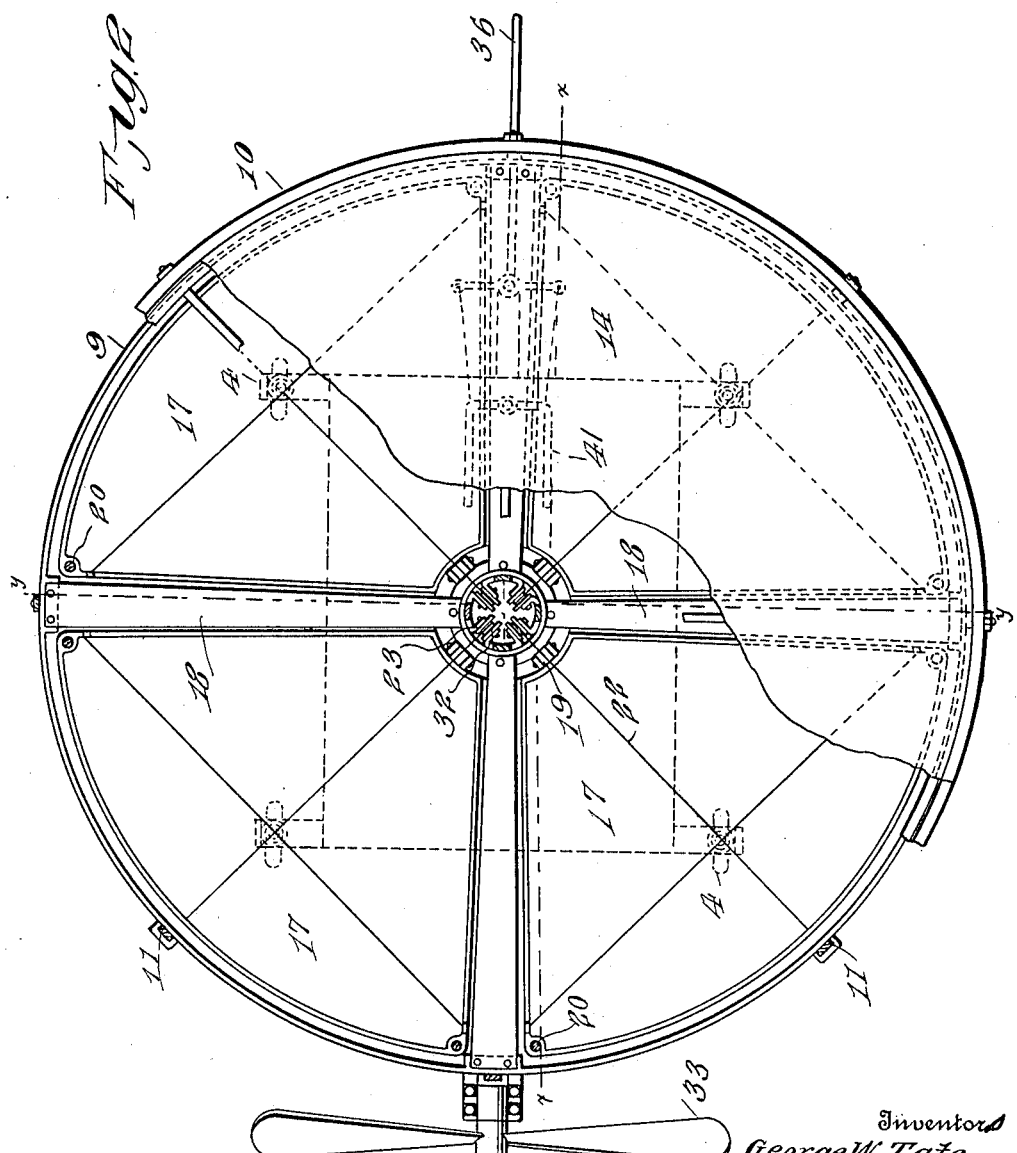

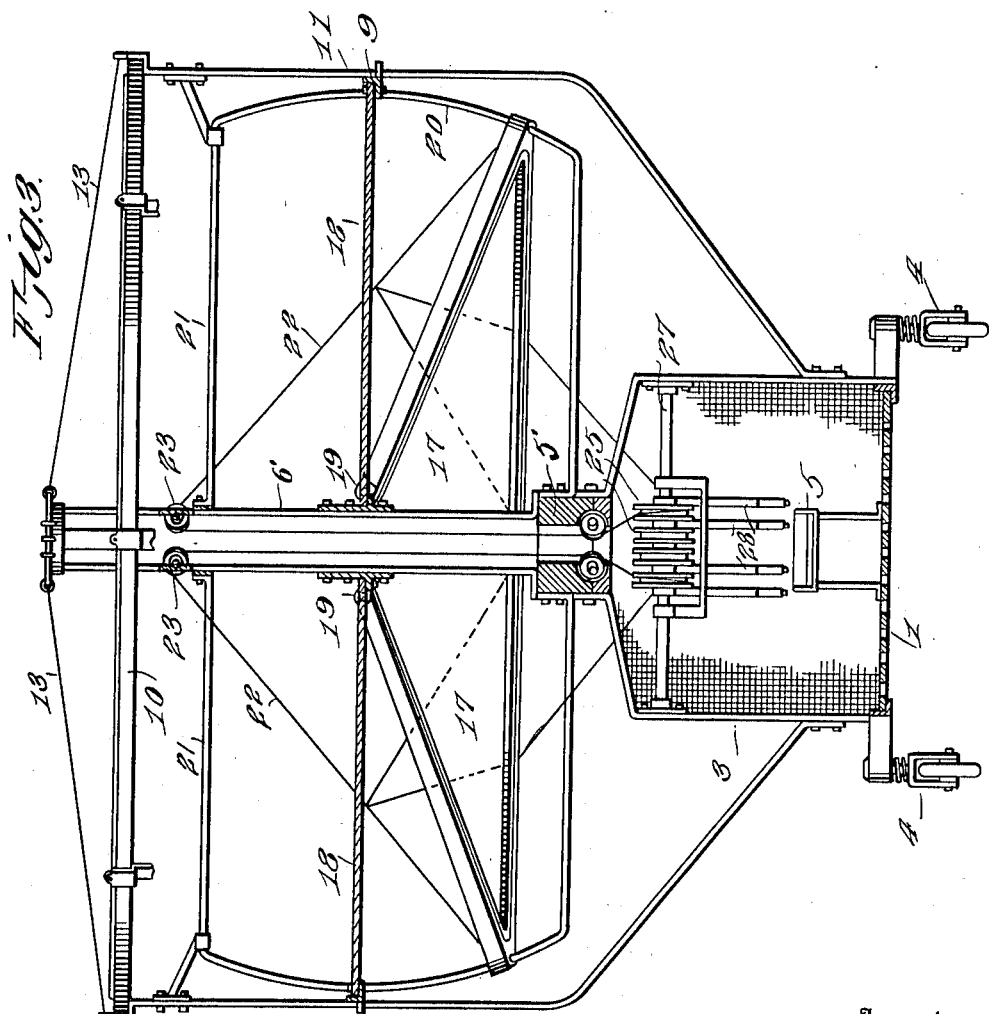

UNITED STATES PATENT OFFICE.

GEORGE W. TATE AND CHARLES W. RICE, OF CHAPPELL, NEBRASKA.

FLYING-MACHINE.

1,020,935.  Specification of Letters Patent.  Patented Mar. 19, 1912.

Application filed May 10, 1911, Serial No. 626,157.  Renewed December 14, 1911.  Serial No. 665,802.

*To all whom it may concern:*

Be it known that we, GEORGE W. TATE and CHARLES W. RICE, citizens of the United States, residing at Chappell, in the county of Deuel and State of Nebraska, have invented new and useful Improvements in Flying-Machines, of which the following is a specification.

This invention relates to flying machines, and its objects are to provide a flying machine of the "heavier-than-air" type which cannot lose its fore and aft or lateral balance; which can be steered and controlled with ease and facility; which is designed to afford protection to the aviator from flying missiles or dangerous birds; and which may be converted into a parachute for safe descent in the event of danger.

The invention consists of the novel features of construction, combination and arrangement of parts hereinafter fully described and claimed, reference being had to the accompanying drawings, in which:

Figure 1 is a vertical, longitudinal section on line $x$—$x$ of Fig. 2 of a flying machine, embodying our invention. Fig. 2 is a top plan view, showing a portion of the upper plane broken away and the remainder of the structure in horizontal section to expose the lower plane, the sections of the latter appearing in normal position. Fig. 3 is a vertical transverse section on line $y$—$y$ of Fig. 2, showing the rear sections of the lower plane depressed.

In the organization of our improved flying machine we provide a car of generally circular or other suitable form and comprising a slatted base or platform 1 and a cage or inclosure 2 rising therefrom, said cage consisting of a skeleton frame covered by a body of woven wire 3 or other suitable reticulated material. This cage allows the aviator to have free observation in all directions, and protects him from flying missiles and possible attacks from dangerous birds. The car is mounted upon suitably cushioned launching and landing wheels 4 and contains the aviator's seat 5 and driving motor 6, which are supported upon the platform 1.

The top portion of the cage supports a tubular head 5' from which rises a hollow or tubular mast 6', preferably constructed of an annular series of spaced rods or bars secured at their lower ends to the head and united at suitable intervals above the same by coupling collars or bands 7 and 8. The column is disposed at the center of an open work head frame, preferably comprising rims or bands 9 and 10, of circular or other suitable form, and secured to an annular series of vertical rods or bars 11 which converge or incline at their lower ends and are suitably fastened to the frame of the cage. The column projects above this head frame and is provided at its upper end with a coupling ring 12 connected with the upper extremities of the uprights 11 by wires or other suitable braces 13.

Mounted upon the upper portion of the head frame 11 is an upper main plane or supporting surfaces 14 corresponding in contour to said frame, and comprising a suitable fabric covering stretched over a frame secured to the collar 8 and rim 10, which plane may be curved or inclined from front to rear to obtain the desired supporting action of the air thereon. This plane is imperforate except at the center where a vent or air opening 15 is formed by the tubular mast at the point where it is encircled by said plane.

Disposed within the head frame between the upper main plane and the car is a lower main plane 16 corresponding in form and dimensions with said upper main plane and divided in a direction longitudinally and transversely of the machine into quadrangle sections 17, which are normally arranged horizontally between similarly shaped receiving spaces formed between the rim 9 and an annular series of radial arms 18 extending between said rim and the collar or sleeve 7. The said lower plane as a whole may be curved or inclined in a fore and aft direction for the dynamical reaction of the air thereon and the sections 17 thereof are pivotally mounted, as at 19, at their inner portions or vertices upon the collar 7 to swing in a vertical plane. Each section 17 is composed of a frame and a fabric covering and the outer corner edges thereof slidably engage curved guide rods 20 connected with the column or mast 6' by horizontal arms 21, by which the plane sections are stayed and braced and adapted to swing in determined paths.

Secured to the center of the outer edge of each of the plane sections 17 is a rope or cable 22 which projects inwardly and upwardly and passes over a guide pulley 23 mounted within the tower, thence extends down through the tower and tubular head 5' and over a guide pulley 24 contained in the latter, and is wound around a drum 25 arranged within the car. From the drum this rope or cable thence passes outwardly over a guide pulley 26 on the car and thence upwardly and is attached to the underside of the plane section at a point immediately below the point of attachment first mentioned, the construction and arrangement thus being such that when the drum is turned in one direction one end of the cable will be relaxed and the other tightened, so that the plane section may be adjusted in either an upward or a downward direction from its normal horizontal position. The several drums 25 to which the operating cords or ropes controlling the several plane sections 17 are attached are loosely mounted upon a transverse shaft 27 arranged within this car, and each drum is provided with a depending handle 28 so disposed as to be conveniently manipulated from the aviator's seat 5. The levers extend downwardly through a slotted guide 29 provided with a series of rack segments 30 equal in number to the levers, each of which carries a spring actuated locking pawl 31 adapted to engage the coacting segment to lock the lever in adjusted position, whereby the plane section controlled by any particular lever may be secured in any position within its range of movement.

In the operation of the machine, the planes 14 and 16 serve as supporting surfaces when the machine is driven at the required speed to sustain said machine in flight. The sections of the lower plane are imperforate, but this plane is provided, like the upper plane, with an air vent or passage 32 formed by the tubular column or mast at the point where the sections of said plane are pivoted thereto. To cause the machine to ascend the front plane sections 17 are tilted upwardly to the desired degree, while the rear plane sections 17 are tilted downwardly to a corresponding degree, and by adjusting these sets of planes in the reverse direction the machine may be caused to descend, whereby steering in a vertical plane may be accomplished in a simple and effective manner. Owing to the low center of gravity of the machine and the form and structure, as well as the arrangement of the supporting surfaces, the machine will balance itself inherently to a certain degree, so that it cannot oscillate beyond a certain point on either of its axes, whereby any possibility of its turning over in the air is obviated. By depressing the rear plane section 17 on either side of the longitudinal center of the machine, the machine may be steered horizontally in the direction toward the opposite side; that is to say, by depressing the left hand rear plane section the machine will be steered to the right, while by depressing the right hand rear plane section the machine will be steered to the left. The plane sections 17 may be independently or simultaneously adjusted as occasion may require at any time to correct longitudinal and lateral tilting, enabling a perfect equilibrium to be maintained. If through stoppage of the motor or other cause, an immediate landing is made necessary, all of the plane sections 17 may be depressed and will thereby form a parachute, by which the machine will be supported and allowed to descend slowly and safely to the ground.

For driving the machine, a propeller 33 is shown at the front mounted upon a horizontal shaft 34 journaled in bearings on the head frame and tubular head 5' and connected by a sprocket chain drive 35 with the motor 6, but any other suitable type and arrangement of propelling mechanism may be employed. For steering horizontally under ordinary conditions the rear vertical rudder 36 is provided and mounted on a vertical shaft 37 journaled in bracket arms 38 and provided with oppositely extending crank arms 39, which are coupled by connections 40 with a shoulder fork or other suitable operating device 41.

Having thus described the invention, what we claim is:

1. A flying machine comprising a car formed of an open work platform and a cage supported thereby and having a reticulated covering, said cage being provided with a top portion, a tubular head supported by said top portion, a tubular mast rising from the head, a head frame supported by the mast and cage, a supporting surface carried by the mast and having movable portions, controlling devices for said movable portions extending downward through the tubular mast and head, and suitable propelling mechanism.

2. A flying machine comprising a car, a tubular mast rising therefrom, an upper fixed plane carried by the mast, a lower plane formed of pivoted sections carried by the mast, and connections for controlling said pivoted sections extending downwardly to the car through said mast.

3. A flying machine comprising a car, a tubular mast extending upwardly therefrom, a head frame secured to the car and mast, an upper main plane supported by the mast and head frame, a lower main plane supported by the mast within the head frame and comprising a series of pivoted sections, guides supported by the mast for the free edges of said sections, and controlling connections for said pivoted sections of the lower plane extending downwardly into the car through said tubular mast.

4. In a flying machine, a support having openings forming an air vent, a substantially circular plane comprising a series of segmental sections pivoted to said support, said sections being movable upwardly and downwardly from a normal horizontal position, guiding means for said sections, and controlling devices for adjusting the pivoted sections, said sections being adapted when simultaneously adjusted downwardly to form a parachute.

In testimony whereof we affix our signatures in presence of two witnesses.

GEORGE W. TATE.
CHARLES W. RICE.

Witnesses:
H. I. BABCOCK,
PERCY RICE.

Copies of this patent may be obtained for five cents each, by addressing the "Commissioner of Patents Washington, D. C."